United States Patent [19]

Wolf et al.

[11] 4,454,803
[45] Jun. 19, 1984

[54] TOASTER

[75] Inventors: Fred G. Wolf, West Long Branch; William C. Schneider, Toms River, both of N.J.

[73] Assignee: Alco Foodservice Equipment Company, Miami, Fla.

[21] Appl. No.: 400,987

[22] Filed: Jul. 22, 1982

[51] Int. Cl.³ .............................................. A47J 37/08
[52] U.S. Cl. .................................. 99/329 RT; 99/335; 99/391
[58] Field of Search ....... D7/330; 99/329 R, 329 RT, 99/334, 335, 385, 390, 391, 392, 393

[56] References Cited

U.S. PATENT DOCUMENTS

| D. 219,896 | 2/1971 | Hegeman | D7/330 |
|---|---|---|---|
| D. 244,343 | 5/1977 | Hanson | 99/329 RT X |
| 1,529,342 | 3/1925 | Christy | |
| 1,720,800 | 7/1929 | Morrison | |
| 1,739,155 | 12/1929 | Lincoln | |
| 1,769,893 | 7/1930 | Uhl | |
| 1,821,226 | 9/1931 | Mabey | |
| 1,841,301 | 1/1932 | Schroeder et al. | |
| 1,852,398 | 4/1932 | Bersted | |
| 1,948,739 | 2/1934 | Wolcott et al. | |
| 2,444,510 | 7/1948 | Isserstedt | 99/338 |
| 2,548,958 | 4/1951 | Di Rosa et al. | 99/327 |
| 2,588,100 | 3/1952 | Federico | 99/327 |
| 2,644,392 | 7/1953 | Foster | 99/329 RT |
| 3,336,858 | 8/1967 | Maindonald | 99/391 |
| 3,789,749 | 2/1974 | Paaskesen | 99/391 |
| 3,824,915 | 7/1974 | Capucio | 99/329 |
| 4,098,178 | 7/1978 | Lalancette | 99/329 |

Primary Examiner—Billy J. Wilhite
Attorney, Agent, or Firm—Howson and Howson

[57] ABSTRACT

This drop-down toaster has a bread support and a door at the bottom of each toasting compartment. The door has a series of vent holes for air convection which produces improved uniformity in the toast. The door and bread support are held closed by rollers on solenoid-controlled sliding bars. The rollers allow the door to swing open before the bread support is released, and they return the door and bread support to their normal condition automatically by a cam action. The bread support is cammed upwardly before release to dislodge bread from the toasting compartment guide wires. An electronic timing circuit is located in a base underneath and spaced vertically from the toasting section so that it is not affected by heat from the toasting section. The timing circuit is compensated in accordance with previous use rather than by sensing the temperature of the toasting compartment. That is, for any two successive toasting cycles, the second toasting cycle is made longer if the interval between the two cycles is longer and shorter if the interval between the two toasting cycles is shorter. Similarly, the second toasting cycle is dependent on the length of the preceding toasting cycle so that if the preceding toasting cycle is short, the second toasting cycle is long, and vice versa. The relay for switching current in the toaster heating elements is remote from the timer circuit board so that it can be replaced in the event of a short circuit without disturbing the circuit board.

4 Claims, 7 Drawing Figures

TOASTER

BRIEF SUMMARY OF THE INVENTION

This invention relates to bread toasters and specifically to toasters having low or medium output rates intended primarily for use in restaurants, diners and cafeterias and in various institutional foodservice facilities, for example messhalls, galleys and the like.

There are three basic types of toaster: the pop-up toaster, the continuous toaster, and the drop-down toaster. In addition, other miscellaneous types of toasters exist, such as the now obsolete door-type toaster.

Pop-up toasters, which are the most common toasters used in the home, are also very popular in foodservice facilities. These toasters are mechanically complex. Light-duty varieties of pop-up toasters are notoriously unreliable. Heavy-duty pop-up toasters and well-made light-duty machines can be quite reliable, but are usually expensive to make and difficult to repair. The principal reason for the unreliability, high cost, and difficult repair of pop-up toasters is the large number of moving mechanical parts required for a workable pop-up mechanism. Another problem with pop-up toasters is that if slices of toast are not promptly removed from the toaster when toasting is completed, they tend to dry out because they remain situated partly in the toasting compartment and continue to be heated by the residual heat within the toaster. Pop-up toasters also require frequent cleaning because of bread crumb accumulation. Unless regular cleaning takes place, crumb accumulation gives rise to maintenance problems.

Continuous toasters, i.e., toasters having continuously moving bread conveyors and in which electric heating elements are energized continuously over long periods of time, are suitable only for high-volume use in large restaurants or in institutional foodservice facilities. Even in these restaurants and institutional facilities, continuous toasters are wasteful of energy unless their use is limited to peak hours.

The third basic type of toaster, the drop-down toaster, is one in which toast is loaded from the top as in a conventional pop-up toaster, but is discharged from the bottom. A number of these devices have been proposed. In most, bread is temporarily supported in position between sets of electric heating elements by a movable bread support which slides or pivots out of the way when the toasting cycle is completed in order to allow the toasted bread to drop into a receptacle. The drop-down toaster is potentially much simpler than the pop-up toaster, and is much less wasteful of energy than the continuous toaster. Furthermore, unlike the pop-up toaster, it does not continue to heat and dry out slices of toast after toasting is completed. The drop-down toaster also substantially eliminates problems resulting from bread crumb accumulation. Despite these potential advantages, and even though numerous drop-down toasters have been proposed, none of them has met with substantial success. The pop-up toaster is still the most popular type of toaster for home use. In foodservice use, while the continuous toaster has made inroads, the pop-up toaster is still widely used. Drop-down toasters are a rarity.

While it is not altogether clear why the many drop-down toasters heretofore proposed have not been successful, these proposed drop-down toasters are subject to a number of problems which may account for their lack of success.

Some of the previously proposed drop-down toasters have toasting compartments in the form of vertical channels which are open both at the top and at the bottom. Others have vertical channels with bottom closures. Still others have both bottom closures and top closures. Where the channels are open both at the top and at the bottom, bread tends to toast very slowly unless large amounts of energy are used. The excessive time required to toast a slice of bread in a device of this type makes it unsatisfactory for foodservice use. Furthermore, excessively slow toasting of bread tends to dry it out, with the result that the toast produced has a hard and unsatisfactory texture.

The use of a top closure on the vertical channel causes excessive build-up of heat in the machine. Attempts to compensate for excessive build-up of heat by reducing the temperature of the heating elements result in low productivity because of excessively long periods of time required for toasting.

The use of a bottom closure on the channel of a drop-down toaster speeds up the toasting process, but also gives rise to several problems. If the toasting time is short, the bread may be satisfactorily toasted on the outside, but not toasted inside. If a longer toasting time is used, the bread may be too dark on the outside. Thus, when a bottom closure is used on the channel of the toaster, it has been necessary to use short toasting times, and the resulting toast is unsatisfactory. Another result of the short toasting times is a non-uniformity of the toast produced. That is, one slice of toast delivered by the toaster may be quite different from the preceding slice. Non-uniformity also exists in a different sense in that one part of a single slice of toast may be quite dark compared to other parts of the same slice. Because of temperature variations in the toasting compartment, it has not been possible to produce consistently uniform results with very short toasting times.

In some proposed drop-down toasters the bread was supported by a door closing the bottom of the toasting compartment. These toasters were not satisfactory because they were not capable of toasting the lower part of the bread slice satisfactorily. Other toasters having bread supports separate from the door were either too complex or unsatisfactory for other reasons. In one toaster a door and a separate bread support wire were linked together, biased by a spring in the closing direction, and held closed by a solenoid-operated latch. When the latch was opened the weight of the bread caused the bread support wire and door to pivot downwardly. In another toaster, the door and bread support wire were fixed together. In still another toaster, the door was held by a latch, allowed to swing downwardly when the latch was released, and returned to a closed condition manually. None of these toasters was completely satisfactory from the standpoint of simplicity and reliability.

Most of the proposed drop-down toasters, and many of the existing pop-up toasters use mechanical or electronic timing devices to determine the time of residence of the bread in the toasting compartment. A temperature sensor located in the toasting compartment is used to compensate the timer so that, if the toasting compartment is very hot, the toasting time is shortened, while if the toasting compartment is relatively cool, the toasting time is lengthened. The sensing devices are typically bimetallic elements in the case of mechanical timers, and thermistors in the case of electronic timers. In either case, the temperature sensing device is responsive to convection heating by the air within the toasting compartment whereas the bread is toasted primarily by radiant heat. Because the temperature sensor is responsive to convection heating, the compensation of the timer is subject to a number of disturbing factors, particularly where the bottom of the toasting compartment is open so that cool air can enter. For these reasons, compensation of the timer by sensing the temperature of the air within the toasting chamber does not necessarily produce the desired result, namely uniform toast.

Another problem in drop-down toasters is that certain kinds of bread, particularly those with high sugar content, such as raisin bread and refrigerated bread, tend to adhere to the wire guides in the vertical toasting compartment when heated. In some cases, this may prevent the toast from dropping out of the toasting compartment when the toast support pivots or slides out of the way. While this problem has been recognized, the proposed solution, namely a mechanism which shakes the toast loose after the bottom support is fully opened, is complicated and not completely satisfactory.

Another problem in conventional toasters of the type having temperature-compensated timers is that the timer is typically subjected to high temperatures from the toasting compartment. These high temperatures may affect the performance of the timer, and may occasionally cause its failure. This problem exists with mechanical timers as well as with electrical timers.

Another problem in conventional toasters using electronic timers is that the heating elements may occasionally become short-circuited. Short-circuiting of the heating elements is very likely to cause failure of the switching device controlling current in the heating elements. Such failure necessitates replacement of the entire electronic timer circuit.

Another problem with conventional toasters of the drop-down type is that the toast cools after it is dropped into the receptacle underneath the toasting compartment. If the toast is left in the receptacle for too long a period of time, it is no longer suitable to be served. While pop-up toasters tend to keep the toast warm they have a tendency to dry out the toast. Conventional drop-down toasters have no provisions for overcoming the cooling problem.

It is an object of the invention to avoid one or more of the problems discussed above. The principal object of the invention is to provide a toaster having a very high degree of reliability, making it suitable for low or medium volume service in a foodservice facility either by itself or as an adjunct to a continuous toaster.

Among the other objects of the invention are the avoidance of drying of toast, speed of service, ease of use, and uniformity of results. Still further objects of the invention include the avoidance of cold toast, and the provision of a toaster which is structurally simple and easy to repair.

This invention addresses the problem of producing high-quality, uniform toast consistently in a drop-down toaster. The toaster in accordance with the invention comprises a toasting compartment having an elongated horizontal cross-section and having upper and lower ends. An opening at the upper end is provided for the insertion of a slice of bread. Within the toasting compartment, guide means are provided for maintaining the slice of bread substantially vertical while in the toasting compartment. A discharge opening is provided at the lower end of the toasting compartment, and releasable bread support means, within the toasting compartment, engage the lower edge of the slice of bread and temporarily maintain it in the toasting compartment with its lower edge spaced above the discharge opening. An elongated door, located at the discharge opening, is arranged to close the discharge opening. The toaster includes means for establishing a toasting cycle, and means responsive to the toasting cycle-establishing means for opening the door and releasing the bread support means at the end of the toasting cycle. It also includes vent means for effecting a restricted flow of air by convection from outside the toasting compartment upwardly into the toasting compartment from a location below the bread support means. The restricted flow of air helps to produce slices of bread which are uniformly toasted throughout, and also to produce uniformity in the sense that successively toasted slices of bread come out of the toaster substantially in the same condition.

This invention also addresses the problem of complexity and unreliability in prior drop-down toasters. In accordance with the invention, the bread support means comprises means providing a normally horizontal platform pivoted on an axis extending lengthwise of the toasting compartment along one of the sides thereof, and having an arm secured to the platform-providing means and pivoting therewith. The door is pivoted along an axis extending lengthwise of the toasting compartment along one of the sides thereof, and has follower means pivoting therewith. The door is opened, and the bread support is released by means comprising first latch means engageable with the arm secured to the platform-providing means and normally preventing the platform from pivoting downwardly from its horizontal position, and second latch means engageable with the follower means of the door and normally preventing the door from pivoting downward from its closed position. The latch means is movable in response to a toasting cycle-establishing means to positions allowing the door and platform-providing means to pivot downwardly and release a slice of toast through the discharge opening. As will be more apparent from the detailed description, the door and bread support operating mechanism is much simpler and much more reliable than bread-release mechanisms in previously proposed drop-down toasters.

Still further objects and advantages of the invention will be apparent from the following detailed description and the drawings.

DETAILED DESCRIPTION

Figure 1:
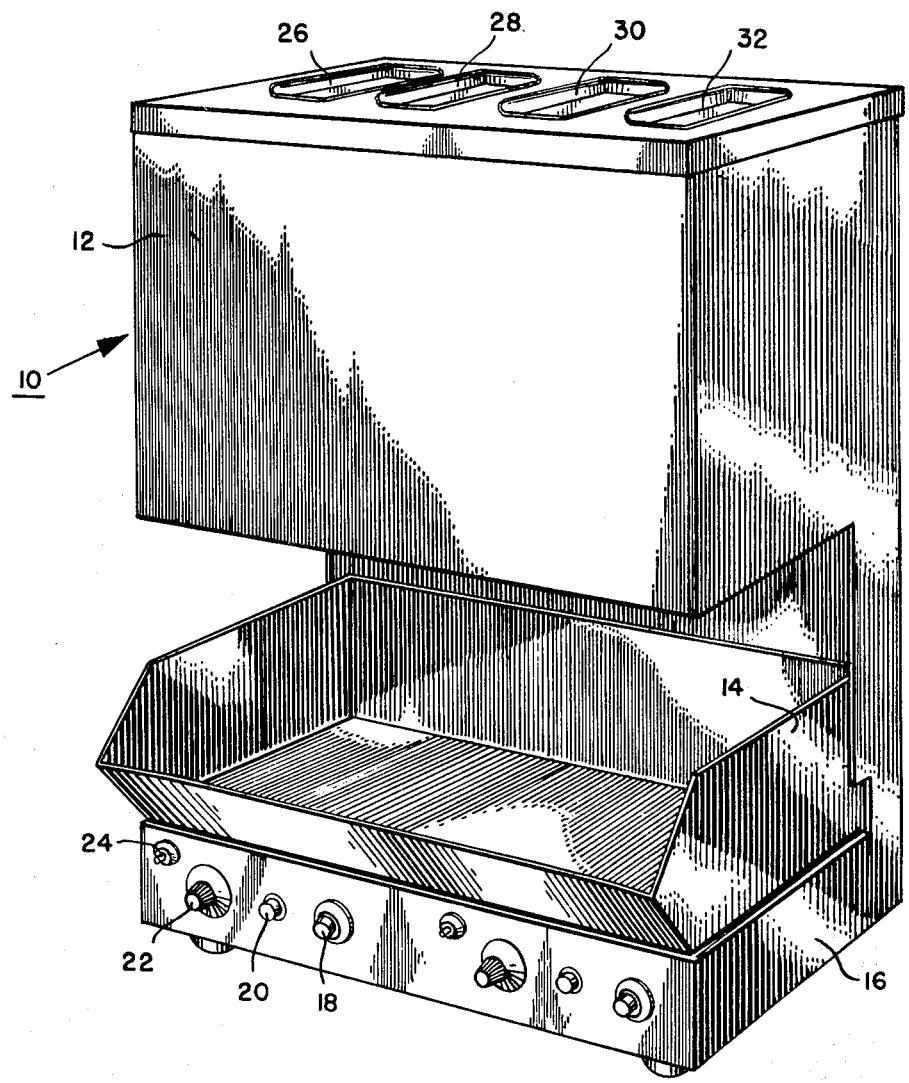
FIG. 1 is an oblique perspective view of a toaster in accordance with the invention having four toasting compartments.

Toaster 10, as shown in FIG. 1, comprises a toasting section 12, a toast collection pan 14 located underneath and spaced from the bottom of the toasting section, and a control section 16 located underneath and supporting collection pan 14. The bottom of the collection pan is preferably spaced from the bottom of toasting section 10 by a vertical distance at least as great as the height of a slice of bread so that, when slices of bread are dropped, they are completely free of the toasting section before they reach the bottom of the collection pan. The distance is typically about 19 cm. or more.

The collection pan is removable for cleaning purposes, and may simply rest upon control section 16.

The toasting section contains two completely independent toasting sections, each having two toasting compartments. The control section contains two completely independent electronic timing circuits, each having its own set of controls on the front panel. The left-hand set of controls comprises a starter button 18, a pilot light 20, a timing adjustment 22, and a reset button 24. These controls serve toasting compartments 26 and 28 in the toasting section. A similar set of controls on the right-hand side of the panel serves toasting compartments 30 and 32. The operation of the controls will be more fully understood from the description of the electronic timer which appears subsequently in this specification. Briefly, however, the toaster is operated as follows. The timer control knob 22 is adjusted to determine the desired lightness or darkness of the toast. Slices of bread are placed into toasting compartments 26 and 28 from above, and starter button 18 is pressed. Pilot light 20 immediately comes on to indicate that toasting is taking place. The electronic timer automatically determines when the desired toasting time has elapsed. The electronic timer then simultaneously deenergizes the heating elements and triggers a mechanical release mechanism which allows the toast to drop downwardly from the toasting section into collection pan 14. The toast release mechanism is automatically reset, and the next toasting operation can be initiated by placing slices of bread into the toasting compartments and pressing starter button 18.

One important advantage over conventional pop-up toasters which is realized by the drop-down mechanism, is the avoidance of continued heating and drying out of the toast. Whereas, toast must be promptly removed from a pop-up toaster in order to prevent it from becoming dried out by heat from the toaster, the toast dropped into collection pan 14 is removed from the heat, and holds its moisture for a considerable period of time following the toasting operation.

If toast has remained in pan 14 for too long a time, and becomes cool, it can be reheated simply by placing it into the toasting compartments from above, and reheated by depressing starter button 18. After a short period of time, e.g. 15 seconds, reset button 24 is depressed. The reset button turns off the heating elements, and simultaneously activates the release mechanism to drop the now warmed toast into the collection pan.

Control section 16, being located below the toasting section, receives comparatively little heat from the toasting section. Therefore, semiconductor circuitry, which is inherently heat-sensitive, can be used in the control section without being adversely affected.

Electrical connections are provided between the control section 16 and the toasting section 12 to control the heating elements and the bread release mechanism, which is solenoid-operated. These electrical connections are preferably located between a pair of closely spaced panels forming the front and back sides of the rear wall of the toaster.

The toasting section is rigidly connected to the control section by the vertical elements at the rear of the toaster. The control section serves as a base, and the vertical elements at the rear of the toaster provide substantially the entire support for the toasting section.

As shown in FIG. 1, toast collection pan 14 is constrained against sidewise and rearward horizontal sliding by the front panel of the rear wall and by flanges extending forwardly from the rear wall. The collection pan can be removed for cleaning simply by sliding it forwardly.

Figure 2:
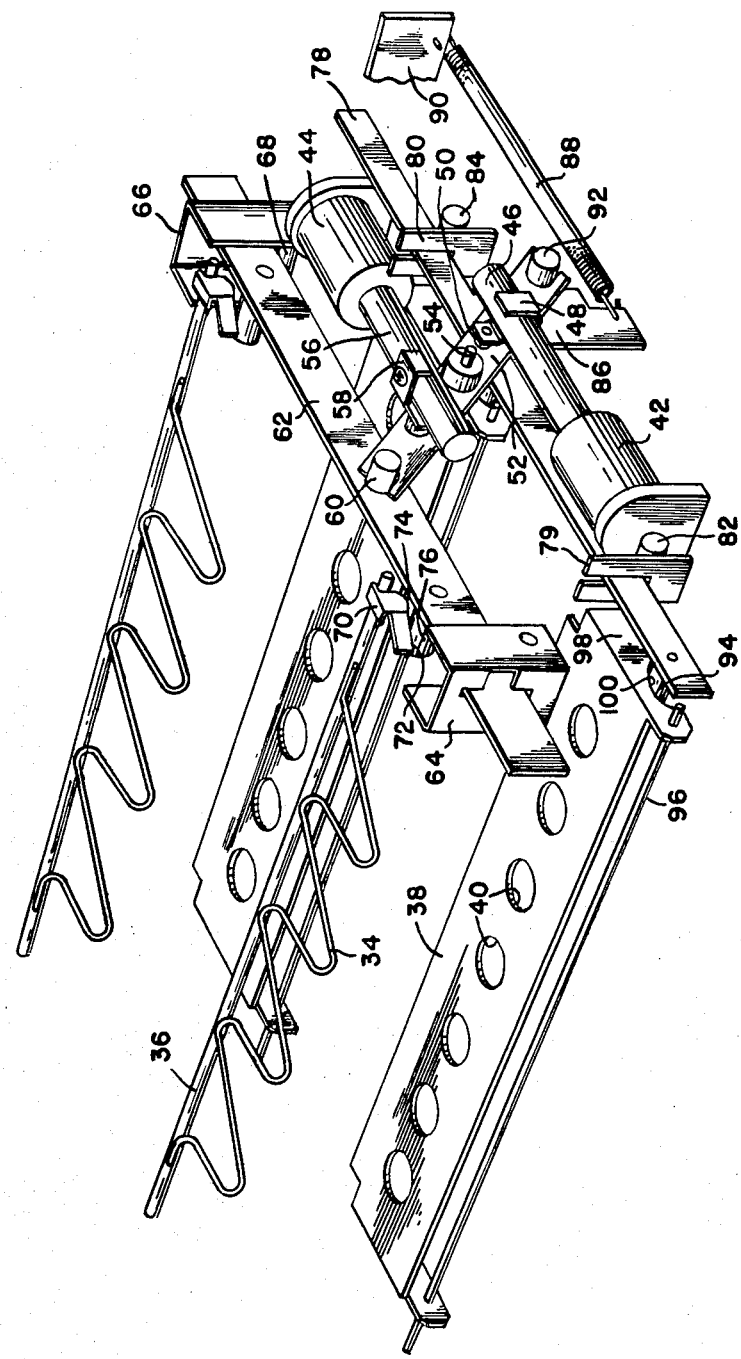
FIG. 2 is an oblique perspective view of the bread release mechanism serving two of the four toasting compartments.

FIG. 2 shows the toast release mechanism serving two of the four toasting compartments. Another similar toast release mechanism serves the other two toasting compartments. The toast release mechanism can be designed to serve any desired number of toasting compartments from one on up. However, experience has shown that the most desirable mechanism is one which serves two toasting compartments simultaneously.

The toast release mechanism of FIG. 2 comprises a sinuous bread support wire 34 normally lying substantially in a horizontal plane and secured to an elongated wire 36. Wire 36 pivots about its longitudinal axis whereby support wire 34 moves from its normal horizontal plane downwardly into a vertical plane to release toast downwardly.

A short distance below bread support wire 34 is a pivoting door 38 which also lies normally in a horizontal plane, but which pivots downwardly into a vertical plane to allow bread released by bread support wire 34 to drop downwardly from the toasting compartment into the collection pan through a discharge opening.

Door 38 is preferably in the form of an elongated metal sheet having a series of circular holes 40 evenly distributed in a line along its length. Holes 40 serve as vent holes. The total area of holes 40 should be within the range of approximately 2% to approximately 10% of the horizontal cross-sectional area of the toasting compartment. Preferably, the total area of the holes is about 5% of the horizontal cross-sectional area of the toasting compartment. These holes serve as vent holes, allowing a restricted upward flow of air into the toasting compartment by convection. The flow of air through the toasting compartment removes excessive moisture from the surface of the bread in the toasting compartment. This prevents heat from being wasted in evaporating moisture and therefore enables the bread to begin darkening more quickly. The flow of air through holes 40 also results in a more consistent temperature rise in the toasting compartment. It helps to produce slices of bread which are uniformly toasted throughout, and also to produce uniformity in the sense that successively toasted slices of bread come out of the toaster substantially in the same condition. By allowing a restricted flow of air through the vent holes, these results can be produced without requiring excessive toasting times.

While the line of holes as shown in FIG. 2 is preferred, the vent holes can be provided in many alternative configurations. While it is possible to provide vent openings in the sides of the toasting compartments and use unperforated doors, providing vent openings in the doors is structurally much simpler, and produces better results because it causes air to flow directly upwardly toward the bread being toasted and past the slice of bread on both sides.

The bread release mechanism is activated by two electrically energized, solenoid-operated linear actuators 42 and 44, which for simplicity will be referred to as "solenoids". Armature 46 of solenoid 42 is provided with a bracket 48. This bracket is fixed on armature 46 by a suitable screw (not shown), and has a cylindrical projection 50 which extends through a circular hole in arm 52. Projection 50 preferably consists of a pin having a rotatable cylindrical PTFE sleeve. The rotation of the sleeve permits the solenoid and arm 52 to cooperate mechanically without producing excessive wear. Similar pins and sleeves are used throughout the bread release mechanism. All of these PTFE sleeves, and the solenoids as well, are protected from the heat of the toasting compartments by suitable metal shields not shown in FIG. 2.

Arm 52 is pivoted on a stationary rod 54, and moves clockwise as solenoid armature 46 is retracted into solenoid 42. Clockwise movement of arm 52 is aided by solenoid 44, the armature 56 of which has a bracket 58 with a sleeved projection extending through a hole in arm 52 above pivot rod 54.

Arm 52 is forked at its upper and lower ends. The fork at the upper end of arm 52 receives a PTFE-sleeved cylindrical projection 60 on slide bar 62. Bar 62 is horizontally slidable in guides 64 and 66. Bar 62 rests on a roller 68 in guide 66 and on a similar roller (not shown) in guide 64. Bar 62 slides toward guide 66 as arm 52 moves clockwise under the action of the solenoids.

An arm 70 is secured to bread support pivot wire 36. Arm 70 is a sheet metal element with a downwardly bent flange having a lower edge 72. Lower edge 72 has a downwardly projecting hump 74. The lower edge of the downwardly extending flange of arm 70 rests on a sleeved projection 76 which extends horizontally from slide arm 62.

As slide bar 62 moves toward the right, projection 76 engages hump 74 and momentarily moves bread support wire 34 upwardly before allowing it to drop downwardly into a vertical plane. This upward motion, which will be better understood from FIGS. 4, 5 and 6, serves to disengage the bread from the guides in the toasting compartment.

Slide bar 78 is held by guides 79 and 80, and slides horizontally over rollers 82 and 84. Bar 78 has a downwardly extending projection 86 to which is secured one end of a return spring 88. Spring 88 is in tension between projection 88 and fixed bracket 90. It urges bar 78 toward the right.

Sleeved projection 92 is engaged by the forked lower end of arm 52, and is secured to projection 86 of arm 78. Therefore, clockwise movement of arm 52 corresponds to a leftward movement of arm 58, and an increase in the tension in spring 88.

Bar 78 has a sleeved projection 94 extending rearwardly from a location near its right-hand end. Door 38 is pivoted on a rod 96 and has a downwardly extending flange 98 at its near end. The lower edge 100 of this flange is contoured and cooperates with sleeved projection 94 in such a way that when bar 78 is in the rest position, as shown, door 38 is held horizontal, i.e., in the closed condition. When the solenoids are energized, and bar 78 moves to the left, projection 94 moves underneath pivot rod 96, and allows the door to swing downwardly into a vertical plane.

The right-hand bread support wire and door in FIG. 2 are operated in a similar manner by rearwardly extending projections near the right-hand ends of bars 62 and 78 in a manner similar to the manner in which support wire 34 and door 38 are operated.

Figure 3:
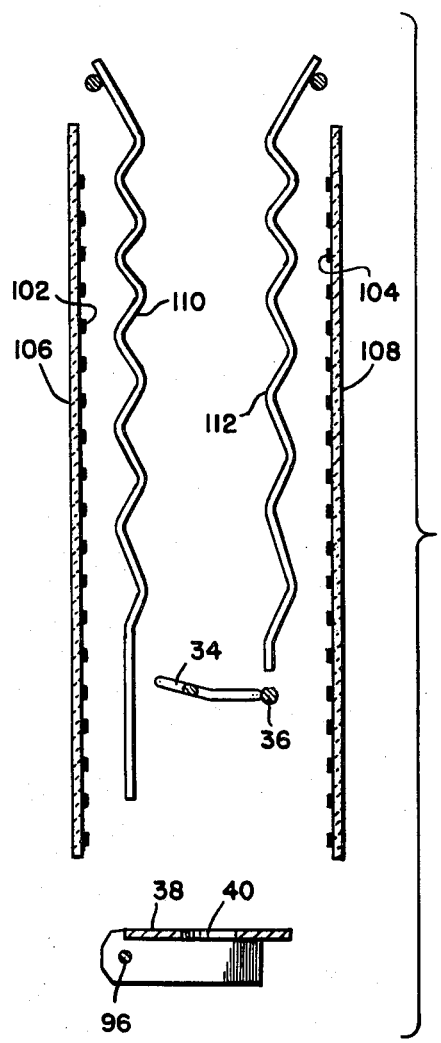
FIG. 3 is a section through a toasting compartment on a vertical plane perpendicular to the long dimension of the compartment.

FIG. 3 shows the relationship between the bread support wire, the door and the principal elements of the toasting compartment. The toasting compartment has resistance wires 102 and 104 which serve as heating elements. These wires are supported on insulating supports 106 and 108 respectively. A series of parallel toast guide wires is provided on each side of the toasting compartment to prevent bread from directly engaging the heating elements. One of the toast guide wires is shown at 110, and another at 112. These toast guide wires are shaped so as not to contact the bread along long continuous lines.

Bread support wire 34 is located near the lower end of the toasting compartment, but between the heating elements near the lower end of the compartment. Door 38 is located below the lowermost extent of the heating elements. Bread support wire 34 is pivoted on the right, while door 38 is pivoted on the left.

Figure 4:
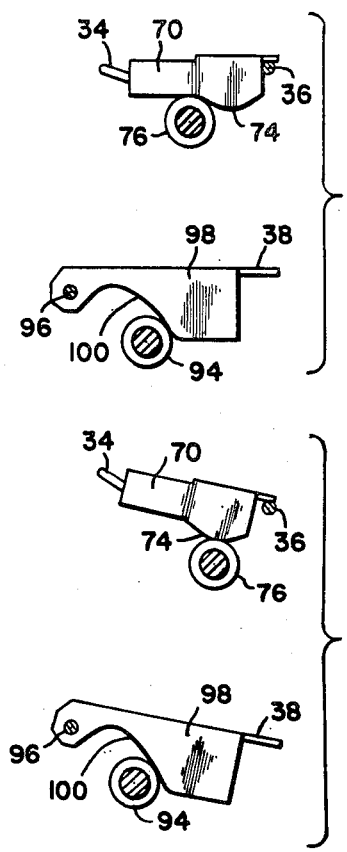
FIGS. 4, 5 and 6 are schematic views of the bread support and door release devices, illustrating several successive stages in the operation of the bread release mechanism.
Figure 5:
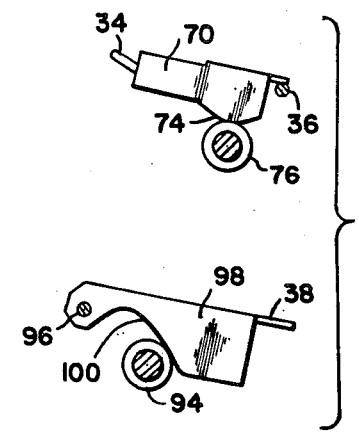
Figure 6:
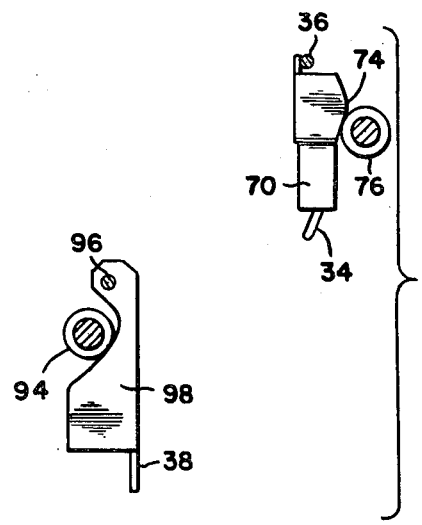

The successive steps in the operation of the bread support wire and the door are illustrated in FIGS. 4, 5 and 6. FIG. 4 shows the support wire and door in the rest position, in which both the support wire and the door are situated substantially in horizontal planes.

As toasting is completed, and upon actuation of the solenoids, projection 76 begins to move toward the right, while projection 94 begins to move toward the left. As shown in FIG. 5, door 38 begins a continuous and steady opening movement, while bread support wire 34 does not begin its opening movement until projection 76 clears arm 70. This insures that the door will be completely open before the bread support wire is released. This action prevents jamming of the toast in the toast release mechanism.

In FIG. 5, projection 76 engages hump 74 on arm 70, effecting a momentary upward movement of bread support arm 34. This movement of arm 34 pushes the toast upwardly, and disengages it from toast guides 110 and 112 in the event that it has adhered to these guides for any reason.

Further rightward movement of projection 76 and leftward movement of projection 94, as shown in FIG. 6, results in the dropping of both the bread support wire and the door into vertical planes, whereby the toast is released and dropped into the collection pan.

Referring again to FIG. 2, when the solenoids are deenergized, spring 88 urges bar 78 to the right. This movement of bar 78, in turn, causes counterclockwise rotation arm 52, and leftward movement of bar 62. Projection 94 acts against edge 100 of flange 98 to return door 38 to its closed condition. Simultaneously, projection 76 acts against edge 72 of arm 70 to return bread support wire 34 to its horizontal condition.

The bread support wire and door are opened by gravity, and closed by the camming action of bars 62 and 78. This is an extremely simple and very reliable system for operating the bread support wire and door. There is no need for any trigger mechanism nor any complex resetting device. The mechanism is also much simpler and more reliable than a system in which the doors and support wires are provided with individual return springs and forced open against the action of the individual return springs. The system shown in FIG. 2 can be modified to serve any desired number of doors and support wires without greatly increasing its complexity.

Figure 7:
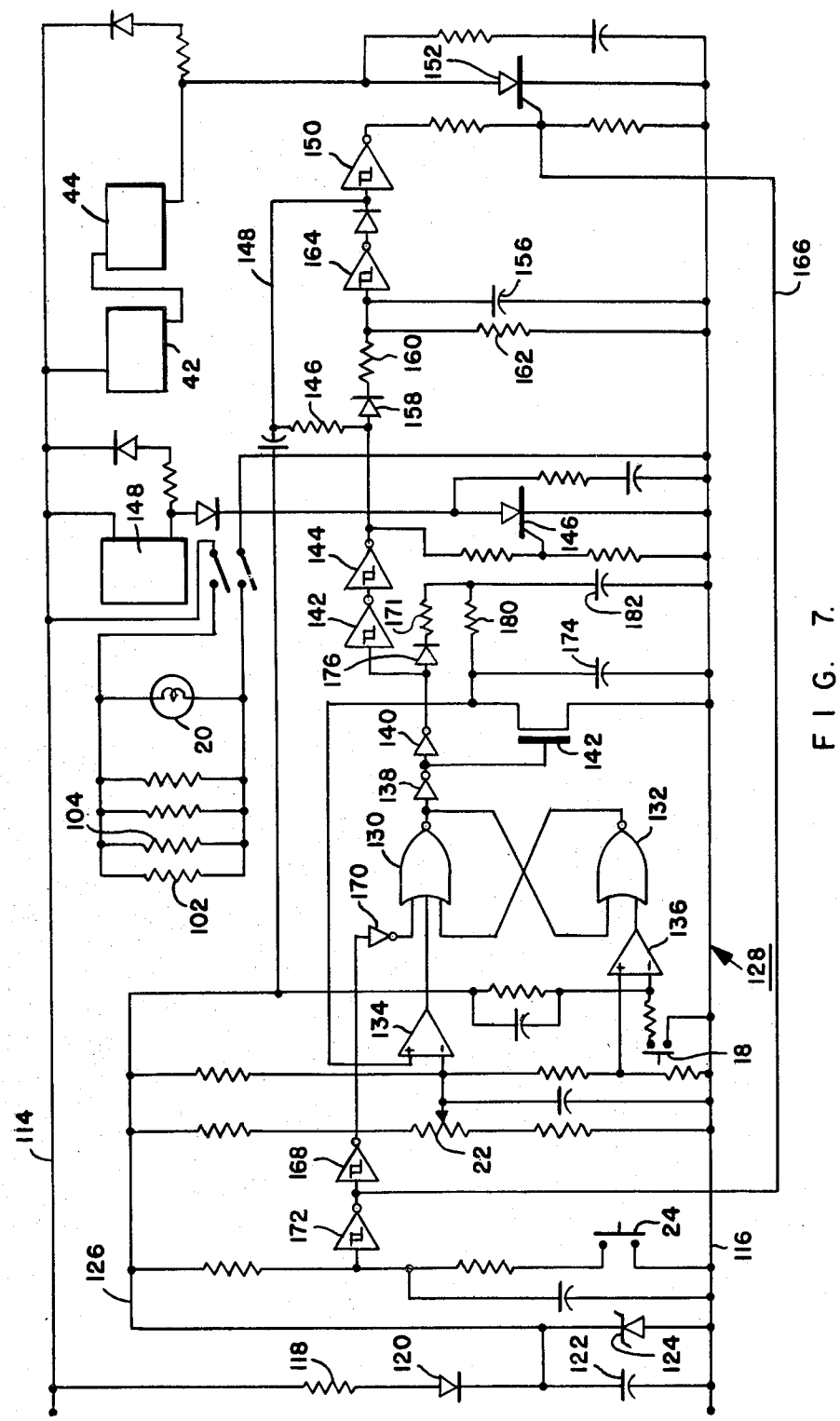
FIG. 7 is an electrical schematic showing the timer circuitry and the heating element control circuitry for two of the four toasting compartments.

Referring to FIG. 7, a supply of alternating current is connected to lines 114 and 116. DC current for operating the electronic timer circuitry is derived through a half-wave rectifier circuit comprising resistor 118, diode 120, capacitor 122 and regulating Zener diode 124. This circuit delivers a low DC voltage to line 126. Line 116 is a common line for both DC and AC.

The duration of the toasting cycle (i.e. the time during which bread is being toasted) is determined by a timer circuit which comprises an integrated circuit timer 128. This timer may be any one of a variety of general purpose timers such as the ICM 7555, available from Intersil. The timer comprises a three input NOR gate 130 interconnected with a two input NOR gate 132 to provide a bistable circuit. A first comparator 134 has its output connected to one of the inputs of NOR gate 130. A second comparator 136 has its output connected to an input of NOR gate 132. The output of the bistable circuit is derived through a pair of inverting output drivers 138 and 140 connected in series. A built-in MOSFET 142, gated by the output of driver 138 is provided to discharge a timing capacitor. Its drain is connected to an input of comparator 134. The other input of comparator 134 is connected to receive a control voltage from timing adjustment 22. One of the inputs of comparator 136 is connected to receive a trigger pulse upon momentary closure of starter button 18. The other input of comparator 136 is connected to a resistive network which holds it at a DC voltage level between the voltage in line 126 and that in line 116.

The output of the timer, derived from the output of inverting driver 140, is connected through a pair of Schmitt triggers 142 and 144 to the gate of an SCR 146. SCR 146 controls a relay coil 148, the contacts of which operate heating elements 102 and 104 in one of the toasting compartments, as well as another pair of heating elements in a second toasting compartment. Pilot light 20 is connected in parallel with the heating elements.

The operation of the timer is such that when push button 18 is momentarily depressed, the output of driver 140 immediately goes high, and remains high for the duration of the toasting cycle as determined by the parameters of the various timing elements, as will be discussed below. As soon as the output of driver 140 goes high, SCR 146 is triggered, and the contacts of relay 148 close, delivering current to the heating elements and the pilot light. SCR 146 remains triggered throughout the toasting cycle by a constant DC current at its gate.

At the end of the toasting cycle, the output of driver 140 goes low, and the output of Schmitt trigger 144 similarly goes low, removing gating current from the SCR and deenergizing relay 148.

The output of Schmitt trigger 144 is connected through resistor 146 and line 148 to the input of Schmitt trigger 150, the output of which is connected to the gate of SCR 152. When the output of Schmitt trigger 144 goes low at the end of the toasting cycle, the output of Schmitt trigger 150 goes high, triggering SCR 152. SCR 152 is connected to solenoids 42 and 44, which operate the bread support wires and the doors for two of the toasting compartments.

During the toasting cycle, while the output of Schmitt trigger 144 is high, capacitor 156 charges through diode 158 and resistor 160. When the output of Schmitt trigger 144 goes low at the end of the toasting cycle, capacitor 156 begins to discharge through resistor 162. When the voltage across capacitor 156 becomes sufficiently low, the output of Schmitt trigger 164 goes high, causing the output of Schmitt trigger 150 to go low, thereby removing gating current from SCR 152. The result is that SCR 152 is triggered for a predetermined duration at the end of each toasting cycle. The parameters of capacitor 156 and resistor 162 are chosen so that the time interval during which solenoids 42 and 44 are operated is sufficient to allow toast to drop out of the toasting compartments into the collection pan before the doors and bread support wires are reset by return spring 88 (FIG. 2) to their horizontal conditions. Typically, this time interval is about one second.

The bread release solenoids may also be energized manually by pushbutton 24. This pushbutton is connected to deliver a pulse to Schmitt trigger 172, the output of which is connected through line 166 to the gate of SCR 152. Pushbutton 24 can be used to release bread at any time during the toasting cycle or even before the toasting cycle has begun. Momentary closure of push-button 24 also resets the bistable device by causing a pulse to be delivered to NOR gate 130 through Schmitt trigger 168 and inverter 170.

The duration of the toasting cycle is determined primarily by the value of capacitor 174 and the position of the adjustment of timing adjustment 22. Capacitor 174 is connected to be charged from the output of inverter 140 through diode 176, and resistors 171 and 180. An additional capacitor 182 is connected between the junction of resistors 171 and 180 and common line 116.

When starting button 118 is momentarily pressed, the output of driver 140 goes high, and capacitor 174 begins to charge. When the voltage on capacitor 124 reaches the voltage on the wiper of control 22, the output of comparator 134 goes high triggering the bistable device so that the output of driver 140 goes low and remains low. The duration of the toasting cycle depends upon the position to which control 22 is adjusted. At the end of the toasting cycle, the output of inverter 138 goes high, gating FET 142 into conduction. This causes capacitor 174 to discharge.

If it were not for capacitor 182, the duration of the toasting cycle would be entirely dependent upon the adjustment of control 22. However, capacitor 182 also affects the duration of the toasting cycle. Capacitor 182 charges through resistor 171 when the output of driver 140 is high. Capacitor 182 discharges through resistor 180 and FET 142 when the output of driver 140 is low. Since capacitor 182 is connected to gate 142 through resistor 180, capacitor 182 does not discharge immediately when the toasting cycle ends. Rather, it discharges at a slow rate. During the toasting cycle, the rate at which capacitor 174 charges is dependent upon the level of charge on capacitor 182. If capacitor 182 is almost fully charged when a toasting cycle is begun, capacitor 174 charges rapidly, and the duration of the toasting cycle is relatively short. On the other hand, if capacitor 182 is almost fully discharged when a toasting cycle is begun, capacitor 174 will charge only slowly, and the toasting cycle will be relatively long. Thus, the duration of any toasting cycle will be affected by the duration of the rest interval following the next preceding toasting cycle. If the rest interval, i.e. the time between toasting cycles, is long, the next toasting cycle should be relatively long, because the toaster will be cool. If the time between toasting cycles is short, the toaster will be hot, and the next toasting cycle should be relatively short. The incorporation of capacitor 182 in the timing circuit accomplishes this result by making the timing circuit responsive to a degree to the interval between toasting cycles. Most significantly, this circuit accomplishes this result without using any thermistor or other temperature-sensitive probe in the toasting compartment.

The duration of any given toasting cycle is also dependent, although to a somewhat lesser degree, on the duration of the next preceding toasting cycle. Assuming a fixed interval between two successive toasting cycles, the charge on capacitor 182 at the beginning of the second toasting cycle will be higher if the first cycle is long than it would be if the first cycle is short. A higher charge on capacitor 182 at the beginning of a toasting cycle shortens the toasting cycle. Therefore, for any two successive heating cycles, the second cycle is shortened if the first cycle is lengthened.

Although the duration of a toasting cycle is affected most heavily by the duration of the next preceding rest interval and to a lesser extent by the duration of the next preceding toasting cycle, it is also affected by earlier toasting cycles and rest intervals, with more remote cycles and rest intervals having a decreasingly significant effect.

Because the timing circuit makes the duration of the toasting cycle dependent on the recent past usage of the toaster, the effect is similar to what occurs in toasters having temperature-compensated timers. The present invention, however, has the advantage of greater simplicity because it eliminates the need for a temperature sensing probe, and it also has the advantage of more consistent performance, since the compensation in the present invention is not subject to disturbing factors such as varying temperatures of the air entering the toasting compartments. Timer compensation in accordance with recent past usage is especially suited to the toaster of the present invention in which external air enters the toasting compartments through vent holes in the bottom doors.

Timer compensation in accordance with recent past usage is also especially suited to a toaster such as the toaster of the present invention in which provision is made for manual resetting in order, for example, to reheat previously toasted bread for a short period of time. The usage compensation circuit takes into account the effect of such relatively short toasting cycles, and modifies the operation of the timer accordingly.

Within the control section of the toaster, the electrical circuitry is divided into two principal parts. The timer circuit and SCRs 146 and 152 are on the same circuit board, while relay 148 is physically separate from the circuit board. Thus, if the relay fails as a result of a short circuit, it can be readily replaced without disturbing the electronic circuit and without requiring its replacement as a unit. If the relay is omitted, and one or more SCRs or triacs are used to switch current in the heating elements these SCRs or triacs should be physically separate from the timer circuit board for similar reasons.

We claim:

1. A toaster comprising a toasting compartment having an elongated horizontal cross-section and having upper and lower ends, an opening at its upper end for the insertion of a slice of bread, guide means for maintaining the slice of bread substantially vertical while in the toasting compartment, and a discharge opening at the lower end, releasable bread support means within the toasting compartment for engaging the lower edge of the slice of bread within the toasting compartment and temporarily maintaining the slice of bread in the toasting compartment with its lower edge spaced above the discharge opening, an elongated door located at the discharge opening and arranged to close the discharge opening, means for establishing a toasting cycle and means responsive to the toasting cycle-establishing means for opening the door and releasing the bread support means at the end of the toasting cycle, said bread support means comprising means providing a normally horizontal platform pivoted on an axis extending lengthwise of the toasting compartment along one of the sides thereof, and having an arm secured to the platform-providing means and pivoting therewith, the door being pivoted along an axis extending lengthwise of the toasting compartment along one of the sides thereof and having follower means pivoting therewith, and the means for opening the door and for releasing the bread support means comprising first latch means engageable with the arm secured to the platform-providing means and normally preventing the platform from pivoting downwardly from its horizontal position and second latch means engageable with the follower means of the door and normally preventing the door from pivoting downwardly from its closed position, the latch means being movable in response to the toasting cycle-establishing means to positions allowing the door and platform-providing means to pivot downwardly and release a slice of toast through the discharge opening.

2. A toaster according to claim 1 including vent means for effecting restricted flow of air by convection from outside the toasting compartment upwardly into the toasting compartment from a location below the bread support means.

3. A toaster according to claim 1 including means for restoring the first and second latch means to the positions in which they prevent the platform and door from pivoting downwardly, and in which the arm and the follower are positioned relative to the respective first and second latch means so that, in the restoring movement of the latch means, the first latch means effects movement of the platform to its horizontal position by engagement with the arm, and the second latch means effects movement of the door to its closed position by engagement with the follower.

4. A toaster according to claim 1 in which the follower means of the door is contoured so that the second latch means allows the opening movement of the door to begin before the first latch means allows the platform-providing means to begin to pivot downwardly.

* * * * *